United States Patent [19] [11] 4,226,907
Sienkowski et al. [45] Oct. 7, 1980

[54] FLAME RETARDANT ARTICLE

[75] Inventors: Kenneth J. Sienkowski; Richard R. Nicholson, both of Ann Arbor, Mich.; Ray E. Smith, Lake Buena Vista, Fla.

[73] Assignee: Velsicol Chemical Corporation, Chicago, Ill.

[21] Appl. No.: 76,098

[22] Filed: Sep. 17, 1979

Related U.S. Application Data

[63] Continuation-in-part of Ser. No. 966,930, Dec. 6, 1978.

[51] Int. Cl.³ .......................... C09D 5/18; D04H 1/58
[52] U.S. Cl. ................................ 428/288; 106/18.14; 106/18.18; 106/18.21; 252/8.1; 260/29.4 R; 428/537; 428/921
[58] Field of Search .............. 106/18.14, 18.18, 18.21; 260/29.4 R, DIG. 24; 8/116 P; 428/288, 537, 921

[56] References Cited

U.S. PATENT DOCUMENTS

| | | | |
|---|---|---|---|
| 2,582,961 | 1/1952 | Burnell et al. | 428/278 |
| 2,661,342 | 12/1953 | Malowan | 428/274 |
| 2,676,162 | 4/1954 | Marotta | 428/920 |
| 2,711,998 | 6/1955 | Weaver et al. | 260/29.4 R |
| 2,927,050 | 3/1960 | Reeves et al. | 428/921 |
| 3,023,176 | 2/1962 | Heistand | 428/274 |
| 3,101,278 | 8/1963 | Wagner et al. | 428/277 |
| 3,398,019 | 8/1968 | Langguth et al. | 428/921 |
| 3,449,161 | 6/1969 | Hindersinn et al. | 252/8.1 |
| 3,513,114 | 5/1970 | Hahn et al. | 260/17 R |
| 3,535,130 | 10/1970 | Webb | 106/18.21 |
| 3,635,970 | 1/1972 | Fessler | 260/17 R |
| 3,654,190 | 4/1972 | Levine | 106/16 |
| 3,769,074 | 10/1973 | Roth | 428/314 |
| 3,811,992 | 5/1974 | Handa et al. | 428/534 |
| 4,026,810 | 5/1977 | Bost | 260/42.45 |
| 4,049,849 | 9/1977 | Brown | 427/325 |

Primary Examiner—Lorenzo B. Hayes
Attorney, Agent, or Firm—Dietmar Olesch; Robert J. Schwarz

[57] ABSTRACT

Disclosed is a flame retardant article comprising an article treated with a flame-retardingly effective amount of an intumescent composition comprising a hydroxyalkyl amino alkyl phosphonic acid, a cyclic nitrogen compound and water.

10 Claims, No Drawings

FLAME RETARDANT ARTICLE

CROSS REFERENCE TO RELATED APPLICATION

This application is a continuation-in-part of U.S. patent application Ser. No. 966,930 filed Dec. 6, 1978.

BRIEF SUMMARY OF INVENTION

An intumescent composition containing a hydroxyalkyl amino alkyl phosphonic acid, methylated methylol melamine, and water.

DETAILED DESCRIPTION

It is difficult to impart durable flame retardance to a wood substrate. Wood substrates present a flameproofing problem which is materially different from that presented by fibrous hydrophilic organic substrates. According to U.S. Pat. No. 2,927,050 in the latter substrate " . . . substantially independent fibers are tangled together, leaving interstices capable of being filled by an aqueous medium by capillary action between all of their surfaces. The individual fibers contain a relatively small amount of cellulose, and the materials composed of them have a relatively low ignition temperature." In wood substrates, however, " . . . the cellulosic fibers are bonded together to form a relatively impenetrable block susceptible to little capillary action. A piece of wood has small surface area in relation to the amount of surface area it contains and has a relatively high ignition temperature." Because of these factors, " . . . a flameproofing agent which flameproofs fibrous hydrophilic organic materials is not likely to flameproof wood because its capacity to inhibit burning is likely to be destroyed by the time it is heated to the ignition temperature of the wood and/or because of the difficulty of causing a non-volatile substance to penetrate into the volume of a block of wood."

Impregnation of a wood substrate with a fire-retardant is known in the art. U.S. Pat. No. 3,398,019 teaches that this method must be used to impart a satisfactory degree of flame retardancy to wood fiber insulation, stating that "as far as is known only by the use of a chemical retardant which impregnates the board can a commercially acceptable building material be produced which is capable of securing a nonflammable rating." U.S. Pat. No. 4,049,849 teaches that this method, although well known, presents several substantial problems. According to this patent, the use of a wood substrate impregnated with a fireretardant salt is restricted to low humidity applications " . . . due to the water solubility and hygroscopicity of most known fire retardant salts." Thus, " . . . if an ammonium phosphate-impregnated wood substrate is exposed to high (greater than 90 percent) humidity at ambient temperature, in approximately 3 days the fire retardant impregnant (salt) will leach therefrom. . . . The salt will absorb sufficient water vapor to enable it to migrate to the wood substrate surface. Not only does this leaching deplete the salt content of the wood substrate, rendering it less fire resistant, but is also severely disfigures the wood substrate's surface . . . ."

Many of the flame retardants which are used to impregnate wood substrates are acidic and hygroscopic. U.S. Pat. No. 3,811,992 teaches that the use of these compositions dehydrates the wood and that " . . . the wood, in order to make up for the dehydration caused by these hygroscopic agents, must absorb water from the moisture in the ambient air." Such moisture absorption will tend to discolor the plywood and rust and stain connecting members such as nails; and it " . . . dilutes the amount of agent used in the wood . . . and causes the wood to be damp and moist thus not only corroding the wood but subjecting it to attack from insects and the like . . . ."

Those in the art have attempted to impart durable flame retardance to wood substrates by applying intumescent compositions to them. Many intumescent compositions have been tested; U.S. Pat. No. 3,668,121 correctly states that only a few of these compositions are of any value. Many of them produce excessive smoke and/or toxic gaseous pyrolysis products. According to U.S. Pat. No. 3,769,074, most of these prior art intumescent compositions are " . . . characterized by the disadvantages of high cost, low spreading rate, relatively poor efficiency, and poor weatherability." U.S. Pat. No. 3,513,114 teaches that prior art intumescent coating compositions " . . . exhibit the distinct disadvantage of either or both failing to maintain a coating film which will withstand repeated scrubbing or washing and thus exhibit wet abrasion resistant properties and/or failing to perform their intended function, that is, to intumesce, and thus fire retard after repeated scrubbing or washing." U.S. Pat. No. 3,535,130 teaches that " . . . conventional intumescent paints are usually sensitive to attack by water . . . ." U.S. Pat. No. 3,654,190 discloses that prior art intumescent compositions are water permeable and tend to degrade when exposed to moist environments.

U.S. Pat. No. 3,513,114 discloses that the problems presented by the prior art intumescent compositions cannot be solved merely by replacing the water soluble flame retardant agents they contain with water insoluble additives, for such substitution does not necessarily increase the wet abrasion resistance properties of the compositions. Furthermore, such a substitution will present a new set of problems if the water insoluble additive must be dissolved in an organic solvent; for many dangers are created by the use of the common organic solvents. Toluene, for example, is a fire hazard and an explosion hazard when exposed to heat and flame; and it emits toxic fumes. Methylene chloride is very dangerous to the eyes. Benzene is highly flammable, causes leukemia, and it is a known carcinogen. Acetone is a fire hazard when exposed to either heat or flame. Methanol possesses narcotic properties and exerts a toxic effect upon the nervous system; once it is absorbed into the body, it is eliminated very slowly and, thus, is a cumulative poison. The use of almost any of the common organic solvents will present some fire hazard or explosion hazard or disaster hazard and/or cause some toxicological problem.

U.S. Pat. No. 3,654,190 teaches that many prior art intumescent coating compositions are soft and prone to chip with rough handling.

Other prior art considered by the applicants during the preparation of this application include U.S. Pat. No. 2,711,998 (composition containing trimethylol melamine and the ammonium salt of halopropyl phosphoric acid used to flame retard cotton), U.S. Pat. No. 2,676,162 (an intumescent coating for wood containing organic solvent, methylated methylol melamine, the reaction product of ammonia and phosphoryl chloride, and a film-forming condensation product), U.S. Pat. No. 3,449,161 (fire-retardancy can be incorporated into paint compositions using organophosphorus amides), U.S. Pat. No. 3,635,970 melamine phosphate is especially useful in intumescent paint compositions), U.S. Pat. No. 4,026,810 (an intumescent flame retardant prepared by reacting, e.g., phosphoric oxide, phosphoric acid, pentaerythritol, and melamine and thereafter curing the reaction product by heating to evolve gaseous products), U.S. Pat. No. 2,582,961 (an aqueous flame retardant for cellulosic fiber containing, e.g., methylated methylol melamine, methylol dicyandiamide, and an oxygen-containing acid of phosphorus), U.S. Pat. No. 2,661,342 (flameproofing of cellulosic materials with a resinous aminoplast condensation product such as melamine and a water-soluble nitrogen-and phosphorus-containing product), U.S. Pat. No. 3,023,176 (a watersoluble hardenable condensation product which is prepared by reacting a methylol compound of the aminotriazine group, an aliphatic compound containing a chain of at least 7 carbon atoms and a reactive hydrogen bound to a hetero atom, and a compound that is capable of introducing atomic groupings that raise the hydrophility in a non-ionic manner), U.S. Pat. No. 3,101,278 (methylol-phosphorus polymers which have nitrogen atoms incorporated into them are excellent flame retardants and are suitable for treating cellulosic materials), and U.S. Pat. No. 3,332,240 (an aqueous solution for flameproofing cotton fiber containing a salt of hydroxylamine and mealmine resin).

Applicants have discovered a unique intumescent composition which is substantially superior to the prior art compositions.

In accordance with this invention, there is provided an intumescent composition comprising a hydroxyalkyl amino alkyl phosphonic acid, a cyclic nitrogen compound, and water, wherein said phosphonic acid is selected from the group consisting of

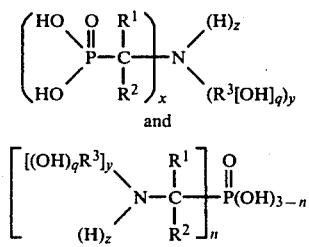

wherein x, y, and n are integers independently selected from the group consisting of 1 and 2, q is an integer selected from the group consisting of 1, 2, and 3, z is an integer selected from the group consisting of 0 and 1, it being understood that the number of substituents on the nitrogen atom is three, $R^1$ and $R^2$ are independently selected from the group consisting of hydrogen, alkyl radicals containing from about 1 to about 6 carbon atoms, and haloalkyl radicals containing from about 1 to about 6 carbon atoms, and $R^3$ is selected from the group consisting of alkyl radicals containing from about 1 to about 6 carbon atoms and haloalkyl radicals containing from about 3 to about 6 carbon atoms, provided that the total number of carbon atoms in the $R^1$, $R^2$, and $R^3$ groups does not exceed about 14; and wherein said cyclic nitrogen compound is

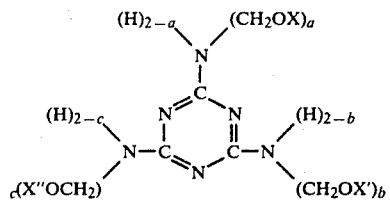

wherein a, b, and c are integers selected from the group consisting of 1 and 2, a plus b plus c equal about 3 to 6, and X, X', and X" are independently selected from the group consisting of hydrogen and —$CH_3$.

The intumescent composition of this invention contains a hydroxyalkyl amino alkyl phosphonic acid. It is preferred that said composition contain from about 15 to about 45 percent of said acid; it is more preferred that the composition contain from about 25 to about 40 percent of said acid. As used in this specification, the term "percent" refers to a weight percent; it is the ratio of the weight of the component involved divided by the combined weights of all the components involved times 100.

The acid used in the intumescent composition of this invention is selected from the group consisting of

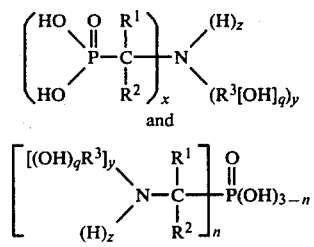

and mixtures thereof, wherein x, y, and n are integers independently selected from the group consisting of 1 and 2, q is an integer selected from the group consisting of 1, 2, and 3, z is an integer selected from the group consisting of 0 and 1, $R^1$ and $R^2$ are independently selected from the group consisting of hydrogen, alkyl radicals containing from about 1 to about 6 carbon atoms, and haloalkyl radicals containing from about 1 to about 6 carbon atoms, and $R^3$ is selected from the group consisting of alkyl radicals containing from about 1 to about 6 carbon atoms and haloalkyl radicals containing from about 3 to about 6 carbon atoms, provided that the total number of carbon atoms in the $R^1$, $R^2$, and $R^3$ groups does not exceed about 14.

Some of the acids which may be used in the intumescent composition of this invention are described in Table I.

TABLE I

| R Substituents | q | y | z | x | n |
|---|---|---|---|---|---|
| $R^1$ is hydrogen | 1 | 1 | 0 | 2 | — |
|  | 1 | 2 | 0 | — | 1 |
| $R^2$ is hydrogen | 1 | 1 | 1 | — | 1 |
|  | 1 | 2 | 0 | — | 2 |
| $R^3$ is methylene $R^1$ is hydrogen | 1 | 2 | 0 | — | 2 |
| $R^2$ is hydrogen | 1 | 1 | 0 | 2 | — |
|  | 1 | 2 | 0 | — | 1 |
| $R^3$ is ethylene $R^1$ is hydrogen |  |  |  |  |  |
| $R^2$ is hydrogen | 1 | 1 | 0 | 2 | — |
|  | 1 | 2 | 0 | — | 2 |
| $R^3$ is propylene $R^1$ is hydrogen |  |  |  |  |  |

TABLE I-continued

| R Substituents | q | y | z | x | n |
|---|---|---|---|---|---|
| $R^2$ is hydrogen | 3 | 1 | 1 | 2 | — |
| $R^3$ is neopentylene | | | | | |
| $R^1$ is methyl | | | | | |
| $R^2$ is methyl | 1 | 1 | 0 | 2 | — |
| | 1 | 2 | 0 | — | 1 |
| $R^3$ is ethylene | | | | | |
| $R^1$ is chloroethyl | | | | | |
| $R^2$ is hydrogen | 1 | 2 | 0 | 1 | — |
| $R^3$ is ethylene | | | | | |
| $R^1$ is ethyl | | | | | |
| $R^2$ is methyl | 1 | 1 | 0 | 2 | — |
| $R^3$ is ethylene | | | | | |

Many other such acids will suggest themselves to those skilled in the art; they also may be used in the intumescent composition of this invention.

The acid used in the composition of this invention may be prepared by methods well known to the prior art. Thus, e.g., some of these acids may be prepared by hydrolyzing a dialkyl bis(hydroxyalkyl)amino methyl phosphonate in accordance with following reaction scheme:

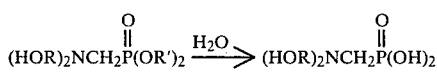

wherein R and R' are independently selected from alkylene of from about 1 to about 3 carbon atoms.

The intumescent composition of this invention contains a cyclic nitrogen compound. It is preferred that said composition contain from about 24 to about 56 percent (by weight) of the cyclic nitrogen compound; it is more preferred that said composition contain from about 35 to about 50 percent (by weight) of said cyclic nitrogen compound. This cyclic nitrogen compound is described by the formula

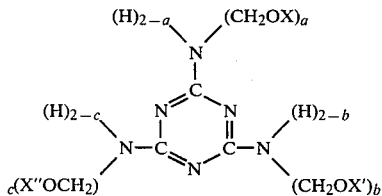

wherein a, b, and c are integers selected from the group consisting of 1 and 2, a plus b plus c equal about 3 to 6, and X, X', and X" are independently selected from the group consisting of hydrogen and —$CH_3$. It is preferred that at least one of said X, X', and X" groups be —$CH_3$. This cyclic nitrogen compound may be prepared by reacting at least three moles of formaldehyde per mole of melamine and then etherifying the methylol groups by reaction of the methylol melamine with methanol in the presence of an acid catalyst.

In the more preferred cyclic nitrogen compound used in the intumescent composition of this invention, at least about two of said X, X', and X" groups are —$CH_3$. In the most preferred embodiment, at least three of said X, X', and X" groups are —$CH_3$.

The intumescent composition of this invention contains water. It is preferred that said composition contain from about 20 to about 40 percent (by weight) of water.

The intumescent composition of this invention may be advantageously utilized with any of the plywood substrates well known to the art such as, e.g., by spraying, brushing, or coating the composition onto the plywood. It is preferred that the dry solids add on of the intumescent composition of this invention by from about 3 to about 15 grams per square foot of plywood surface treated. The "add on" is determined by weighing the substrate before and immediately after the plywood substrate is treated. The percent of solids in the composition times this difference is the number of grams of dry solids applied; the number of grams of dry solids applied divided by the number of square feet treated is the "add on" referred to in this specification. One coat of the intumescent composition of this invention may be applied; it is preferred, however, to apply two or more coats.

After the composition of this invention is applied to the wood substrate, it is dried. It may be air dried, in which case up to about 30 hours should be allowed for it to dry. It may be dried by techniques well known to those skilled in the art. If heat is applied to the treated substrate, it is preferred to use a temperature of from about 70 to about 170 degrees centigrade for from about 1 to about 20 minutes. It is more preferred to dry the treated substrate at a temperature of from about 95 to about 110 degrees centigrade for from about 3 to about 10 minutes.

The composition of this invention also is useful for imparting flame retardance to flammable substrates other than wood paneling. Such substrates include, but are not limited to, those comprised of fibers such as cellulosics, of fibers of synthetic organic polymers such as polyesters and of combinations of these types of fiber and of reconstituted wood products such as fiberboard and particle board. The inventive composition is particularly useful for imparting flame retardance to flammable fibrous substrates used to filter out solids or particulates from fluid streams, either liquid or gaseous. Treatment of filter media with flame retardant systems which rely for their efficacy on the presence of halogen and a metallic oxide such as antimony oxide has been found to give the undesirable effect of reducing fluid flow through the filter. However, treatment of filter media, particularly filter paper, with the inventive composition gives fire retardance without deleterious effects on flow-through rate. Flame retardant filters are especially desirable in fields of use such as automotive carburetor air filters and fuel filters where high temperature and/or flammable fuels are present.

The composition can be used to afford protection from fire damage of non-flammable substrates such as metal, glass or concrete.

The inventive composition is useful also as an adhesive or binder and can be used to replace part, or all, of the adhesive used, for example, to laminate plies of wood together to form plywood panels, to bind together the wood particles used in hardboard, chipboard, particle board and the like, to give structual integrity to non-woven forms, fabrics or batts made from organic fibers such as polyesters or from inorganic fibers made from glass or minerals. The flame retarding effect of the inventive composition aids in preventing fire damage to articles in which they are used as adhesives or binders.

Whether the inventive composition is used solely as flame retarding additive or as a combination fire-retardant/adhesive, it can be applied as a surface treatment or as an impregnation by art-known methods such as spraying, brushing, padding, rolling, dipping, etc. The weight percentage of the inventive composition in the formulation actually applied to the substrate can be adjusted to give desired results in regard to factors such as weight pickup per application or viscosity of the formulation. Additional water may be added to achieve variation of viscosity or to control pickup. In some instances, such as in treating paper, where excessive exposure to water may not be desired, an organic solvent can be used. Suitable organics include the lower alcohol such as methanol, ethanol, butanol and the like—and lower molecular weight glycol ethers. The amount of the inventive composition in the final formulation can be from about 1 weight percent to 100 weight percent.

The amount of weight pickup can also be controlled by varying the quantity of formulation removed from the substrate by operations such as passing the treated or impregnated substrate through rolls under pressure.

After application of the inventive composition to the desired substrate, the final commercial product is produced by a removal of the volatiles—water or organic diluent-followed by a "curing" or polymerization of the dry solids into a water-resistant coating. It is to be understood that this curing occurs even in the presence of the volatiles and even at room temperature, however the rate at which it occurs is increased by higher temperatures. Further, it is often desirable to first remove volatiles in order to have a more easily handleable article. The volatiles-removal and curing can be done in one operation or can be done in two stages: a lower temperature treatment for volatiles-removal followed by a higher temperature for curing. For substrates other than the plywood substrates hereinabove described, the volatiles removal can be accomplished by air drying at room temperature for a period of from 16 to 48 hours however it is preferable to use temperatures of from about 70° C.–110° C. for a period of from about 0.2 to 20 minutes. It is preferred to carry out the curing operation at temperatures of from about 110° C. to 250° C. for periods of from about 0.2 to 10 minutes.

Where the type of substrate to which the inventive composition is applied is essentially nonporous, so that substantially all of the inventive composition is on its surface, the "add on" is calculated in terms of weight per area as described hereinabove. For such substrates, it is preferred that the add on be from about 3 grams to about 18 grams per square foot.

Where the type of substrate which the inventive composition is applied is porous enough to allow a substantial amount of the inventive composition to penetrate into its interior, substrates, for example, such as papers, fabric (woven and non-woven) and batts, dry solids add on can better be expressed as a weight percentage calculated by use of the expression:

$$\frac{(\text{Weight Substrate} + \text{Dry Solids}) \text{ Minus } (\text{Weight Untreated Substrate})}{(\text{Weight Untreated Substrate})} \times 100$$

The weight of the substrate+dry solids is conveniently found by weighing the treated substrate after removal of volatiles. The weight of dry solids can also be found, as described hereinabove, by finding the difference in weight of the substrate before and immediately after it is treated and then multiplying this difference by the percentage of the solids in the inventive composition applied. Where, in this specification, dry solids add on is given as a percentage, it has been calculated by use of the above expression. For substrates where this type of dry solids add on calculation is used, it is preferred that the dry solids add on be from about 1% to about 100%. A more preferred range of the dry solids add on is from about 5% to 100%.

In the specific uses of the inventive composition as the total adhesive or as a component of adhesives, for plywood, particle board, and the like, no changes in the usual practices of industry regarding the time, temperature and pressure used to effect bonding are required.

As an adhesive, a preferred range of dry solids add on of the inventive composition is from about 3 to 18 grams per square foot of glued surface or from about 3% to 100%.

The following examples illustrate the claimed invention and are not to be deemed limitative thereof. Unless otherwise specified, all parts are by weight, all temperatures are in degrees centigrade, all weights are expressed in grams, and all volumes are expressed in milliliters.

EXAMPLE 1

Sixty-nine grams (1.72 moles) of sodium hydroxide were dissolved in 250 milliliters of water. To this solution of sodium hydroxide were added 200 grams (0.784 moles) of diethyl-N,N-bis(2-hydroxyethyl)amino methane phosphonate. A rapid exothermic reaction occurred. The reaction mixture was maintained at reflux for 60 minutes, at which time the distillation of ethanol commenced. The reaction mixture was refluxed 120 minutes longer and then cooled to room temperature and allowed to stand overnight. The mixture was thereafter acidified with hydrochloric acid, and the reaction mixture was evaporated; the salt which formed was removed by dissolving the reaction product in methanol and filtering it. One hundred and fifty three grams of product were obtained upon removal of the methanol under reduced pressure. The product had an acid number of 400; and phosphorus 31 nuclear magnetic resonance indicated, three absorptions with 115 units of 7 parts per million, 32 units at 3 parts per million, and 7 units at 21 parts per million.

EXAMPLE 2

Two hundred milliliters of diethyl-N,N-bis(2-hydroxyethyl) amino methyl phosphonate and 200 milliliters of an 18 percent hydrochloric acid solution were stirred and refluxed in a 500 milliliter flask for 240 minutes. Volatiles were removed from the reaction mixture; a viscous brown product was obtained. The acid number of the product was 730. Phosphorus 31 nuclear magnetic resonance analyses indicated two absorptions with 49 units at 7 parts per million and 38 units at 2.5 parts per million.

EXAMPLE 3

Fifty parts of an 80 percent aqueous solution of Aerotex Resin M-3 ®, a methylated trimethylol melamine compound available from the American Cyanamid Corporation, were mixed with 50 parts of a 60 percent aqueous solution of N,N-bis(2-hydroxyethyl)amino methyl phosphoric acid. Two coats of this formulation were brushed onto a lauan plywood sample (which contained a groove and was 24" long, 3,5" wide, and 0.1875" thick) to a dry solids add on of about 9.5 grams per square foot. The coated sample was then dried at a temperature of about 100 degrees centigrade for about 5 minutes. Thereafter, the sample was subjected to a two-foot tunnel test to determine its flame spread rate; this test was conducted in substantial accordance with the procedure described in an article entitled "Two-Foot Tunnel Test," *Journal of Paint Technology*, Vol. 11, No. 565, February 1972, pp. 43–47; however the panels were not aged as described in this article.

The two-foot tunnel test is a small-scale test designed to simulate the UL Steiner 25-foot tunnel test described by ASTM E84-68. In the former test, the two-foot tunnel was inclined 28 degrees from the horizontal and utilized approximately 96 square inches of test surface. The test specimen was mounted on an angle iron frame in such a way that the surface to be evaluated formed the ceiling of the tunnel. A standard Meeker burner was placed at the lower end of the tunnel, and the specimen was subjected to the flame from this burner for five minutes; during the first four minutes, the length of the advance of the flame front up the inclined panel was recorded at 15 second intervals. The flame lengths were measured by observing the flame front advance through a calibrated window located on the side of the tunnel. The tunnel was calibrated prior to specimen testing by determining the difference in flame lengths of a specimen of asbestos cement board and a specimen of red oak; this difference, by introduction of a constant K, was given a flame spread rating ("FSR") of 100. The flame spread rate calculation was made in accordance with the formula $F.S.R. = (L_n - L_a)K$, wherein F.S.R. was the flame spread rating, $L_n$ was the observed flame of the specimen tested, $L_a$ was the flame for asbestos cement board, $L_o$ was the observed flame length for the red oak sample, and $K = (100/L_o - L_a)$.

The samples were weighed both before and after being tested in the two-foot tunnel, and the percent weight loss due to combustion of the sample was determined.

The coated plywood sample of this example had a flame spread rating of 20 and lost about 5 percent of its weight after combustion.

COMPARATIVE EXAMPLES 4–6

In these Examples compositions which are outside the scope of this invention were prepared, applied to lauan plywood samples measuring 24.0"×3.5"×0.1875" to the dry solids add on indicated, dried, and evaluated in the two foot tunnel; the procedure described in Example 3 was utilized. Table II indicates that occurred in these experiments.

TABLE II

| Example Number | Composition Used | Dry Solids Add On | Flame Spread Rating | Percent Weight Loss |
|---|---|---|---|---|
| 4 | 50 parts methylated hexamethylol melamine; 40 parts diethyl N,N-bis(2-hydroxyethyl)amino methyl phosphonate; 5 parts 85% soln. of phosphoric acid; 5 parts water | 10 | 115 | N.D. |
| 5 | 50 parts methylated hexamethylol melamine; 48 parts diethyl N,N-bis(2-hydroxyethyl)amino methyl phosphonate; 2 parts p-toluene sulfonic acid | 9 | 100 | 12 |
| 6 | 50 parts 80% aqueous soln. methylated trimethylol melamine; 50 parts 55% aqueous soln. chloroneopentyl phosphoramidate | 9 | 115 | not determined |

TABLE II-continued

| Example Number | Composition Used | Dry Solids Add On | Flame Spread Rating | Percent Weight Loss |
|---|---|---|---|---|
| | tetramethylol. | | | |

EXAMPLE 7

To 100 parts of the formulation of example 3 is added 100 parts of water. Samples of fabrics comprised of cotton, polyester/cotton, polyester, polypropylene and wool are padded with this formulation, nipped on rolls to give a dry solids add on of from 20% to 40% and are then heated to a temperature of approximately 100° degrees centigrade for a period of approximately 5 minutes. The test pieces are then subjected, while in a vertical to position, to the flame of a paper match for a period of 15 seconds. The behavior of the fabric while exposed to the flame is noted as to whether "dripping" of the fabric occurs; behavior after flame removal is also noted as to whether the fabric self-extinguishes or continues to burn.

EXAMPLE 8

The formulation of example 3 is applied to a surface of fiberglass-reinforced polyester to give a dry add on of 6 grams per square foot. The treated surface is held in a vertical position and subjected to the flame of a propane torch for a period of 60 seconds.

EXAMPLE 9

Five pieces of thin wood paneling, approximately 9 inches by 9 inches, are coated with the formulation of example 3. The five panels are stacked, one atop the other, and subjected to a pressure of about 1000 pounds per square inch at a temperature of about 100° degrees centigrade for a period of about 8 minutes.

EXAMPLE 10

The formulation of example 3 is applied to one surface of a piece of window glass to give a dry solids add on of about 12 grams per square foot. The flame retardant effect of the formulation is tested by impinging on the treated surface the flame of a propane torch.

EXAMPLE 11

The formulation of example 3 is applied by an air atomizing spray gun to a fiberboard panel to give a dry solids add on from about 12 to 14 grams per square foot. The board is dried at a temperature of about 225 degrees Fahrenheit for a period of about 1.5 minutes.

EXAMPLE 12

The formulation of example 3 is applied to one face of a block of polyurethane foam. The flame retardancy of the treated face is tested by subjecting it to the flame of a propane torch.

EXAMPLE 13

To 35 parts of the formulation prepared in example 3 is added 65 parts of methanol. Sheets of paper approximately 6 inches by 6 inches are dried at a temperature of about 300 degrees Fahrenheit for a period of about 10 minutes, weighed, dipped into the methanolic solution, removed, sandwiched between two blotters and the sandwich passed through nip rollers to remove sufficient formulation to obtain a dry solids add on of 25%. The sheets are removed from the sandwich, air dried at room temperature for a period of about 1 hours, then are cured at a temperature of about 300° Fahrenheit for a period of about 15 minutes. The flame retardancy of the treated paper is tested by subjecting the paper, held in a vertical position, to the flame of a paper match for a period of 15 seconds.

EXAMPLE 14

Glass fiber batting is dipped into the formulation of example 3, excess material removed by nipping through rolls and heated for approximately 3 minutes at a temperature of approximately 100° degrees centigrade. The treated batting is tested for fire retardancy by subjecting it to the flame of a propane torch.

The above examples have been described for the purpose of illustration, not limitation. Many other modifications will suggest themselves to those skilled in the art; they are intended to be comprehended within the scope of this invention.

The embodiments of this invention in which an exclusive property or privilege is claimed are a follows:

1. A flame retardant article comprising an article treated with a flame-retardingly effective amount of an intumescent composition comprising a hydroxyalkyl amino alkyl phosphonic acid, a cyclic nitrogen compound, and water, wherein said phosphonic acid is selected from the group consisting of

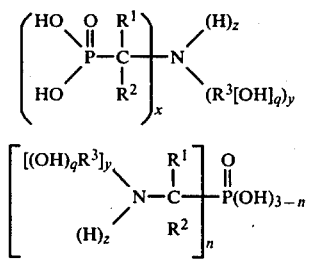

wherein x, y, and n are integers independently selected from the group consisting of 1 and 2, q is an integer selected from the group consisting of 1, 2, and 3, z is an integer selected from the group consisting of 0 and 1, $R^1$ and $R^2$ are independently selected from the group consisting of hydrogen, alkyl radicals containing from about 1 to about 6 carbon atoms, and haloalkyl radicals containing from about 1 to about 6 carbon atoms, and $R^3$ is selected from the group consisting of alkyl radicals containing from about 1 to about 6 carbon atoms and haloalkyl radicals containing from about 3 to about 6 carbon atoms, provided that the total number of carbon atoms in the $R^1$, $R^2$, and $R^3$ groups does not exceed about 14; and wherein said cyclic nitrogen compound is

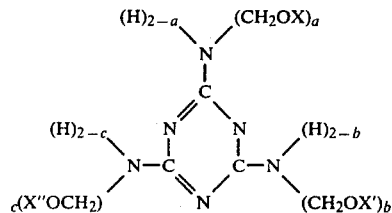

wherein a, b, and c are integers selected from the group consisting of 1 and 2, a plus b plus c equal about 3 to 6, and X, X', and X'' are independently selected from the group consisting of hydrogen and —$CH_3$.

2. The flame retardant article of claim 1 wherein said intumescent composition contains, by weight, from about 15 to about 45 percent of said hydroxyalkyl amino methane phosphonic acid, and from about 24 to about 56 percent of said cyclic nitrogen compound, and from about 20 to about 40 percent water.

3. The flame retardant article of claim 1 wherein said article is plywood.

4. The flame retardant article of claim 2 wherein said article is plywood.

5. The flame retardant article of claim 1 wherein said article is filter paper.

6. The flame retardant article of claim 2 wherein said article is filter paper.

7. A flame retardant article comprising thin layers of wood bonded together with an adhesively-effective and flame-retardingly effective amount of the intumescent composition of claim 1.

8. A flame retardant article comprising thin layers of wood bonded together with an adhesively-effective and flame-retardingly effective amount of the intumescent composition of claim 2.

9. A flame retardant article comprising fibers bonded together with an adhesively-effective and flame-retardingly effective amount of the intumescent composition of claim 1.

10. A flame retardant article comprising fibers bonded together with an adhesively-effective and flame-retardingly effective amount of the intumescent composition of claim 2.

* * * * *